United States Patent Office 3,792,019
Patented Feb. 12, 1974

3,792,019
FILMS OF POLYAMIDE-IMIDES HAVING A UNIPLANAR AXIAL STRUCTURE
Jean Gattus, La Mulatiere, and Maurice Mallet, Lyon, France, assignors to Rhone-Poulenc S.A., Paris, France
No Drawing. Filed Sept. 3, 1970, Ser. No. 69,493
Claims priority, application France, Sept. 5, 1969, 6930338
Int. Cl. C08g 20/32
U.S. Cl. 260—47 CP                   3 Claims

ABSTRACT OF THE DISCLOSURE

Polyamide-imide films having a high elongation at break, and suitable for insulating electrical conductors which are to be subjected to stress, are made from polyamide-imides comprising structural units of formula:

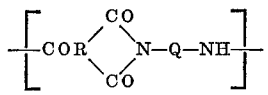

in which R is a trivalent organic radical containing at least two carbon atoms and Q is a divalent radical containing at least one benzene nucleus, and are characterized by a uniplanar axial structure.

They can be made by giving a film of the polyamide-imide a treatment in which (a) it is stretched at 100°–350° C. while it contains at least 1%, preferably 5–30%, of solvent and (b) it is then given a supplementary heat treatment at 100°–350° C., while preventing shrinkage in any planar direction throughout the treatment.

---

This invention relates to films of polyamide-imides having a high elongation at break, and to their production.

It is known that the polyamide-imides in general, and more particularly those whose hydrocarbon skeleton is essentially aromatic, possess excellent resistance to both thermal and chemical degradation as well as good electrical properties. This combination of properties explains why these products have very rapidly aroused interest as an insulating material for the electrical industry, especially for use in coating varnishes.

This coating technique however cannot be used for insulating conductors subjected to major physical stresses during the production of the assembly to which they belong, of if the conductors are required to undergo stresses of a relatively high amplitude when functioning. In order to satisfy these requirements, it will be necessary to have available films which possess in addition good mechanical properties and in particular a high elongation at break.

The aim of the present invention is to produne films which satisfy these requirements.

In one aspect the invention consists in a film of a polyamide-imide comprising a succession of structural units of formula:

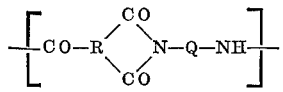

in which R is a trivalent organic radical containing at least two carbon atoms, and Q is a divalent radical containing at least one benzene nucleus and having a uniplanar axial structure (as determined by the method described by C. J. Heffelfinger and R. L. Burton, Journal of Polymer Science 47, 289–306).

In another aspect the invention consists in the production of such a film by giving a film of a polyamide-imide comprising the structural units defined above a treatment in which the film, while it contains at least 1% by weight of solvent, is stretched in at least one direction, at a temperature between 100° and 350° C., and is then subjected to a supplementary heat treatment at a temperature between 100° and 350° C. the film being prevented from shrinking significantly in any direction in its plane throughout the treatment.

Among the polyamide-imides which can be used are those which are obtained from (a) an aromatic anhydride of general formula:

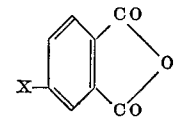

in which X is a carboxyl-containing group such as

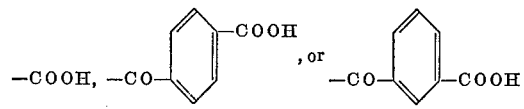

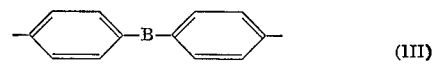

and (b) a difunctional compound of general formula:

$$Y—Q—Y \quad (II)$$

in which Q is a divalent radical containing at least one benzene nucleus such as m-phenylene, p-phenylene, p,p'-diphenylene or $$—\phantom{}\bigcirc\!\!—B—\!\!\bigcirc\!\!— \quad (III)$$

(B being a divalent atom or group such as —O—, —CH$_2$—, —C(CH$_3$)$_2$—, —SO$_2$— or —N=N—), and Y is a —NCO group or a group of formula —NHCOOR in which R is an alkyl radical containing 1 to 6 carbon atoms or a phenyl or methylphenyl radical.

Other polyamide-imides which can be used are those which are obtained from (a) an anhydride of general formula:

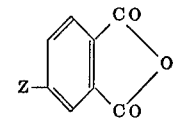

in which Z is a carboxyl chloride-containing group such as:

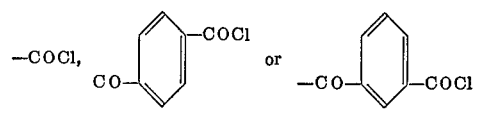

and (b) a di-primary diamine of general formula:

$$H_2N—Q—NH_2 \quad (V)$$

in which Q has the same meaning as before.

The solvent contained in the film subjected to stretching is a polar organic solvent such as N-methylpyrrolidone (which is preferred), dimethylformamide, dimethylacetamide, dimethylsulphoxide or N-methylcaprolactam. Preferably the film to be treated contains 5% to 30% by weight of solvent.

The films to be treated can be obtained by known techniques from solutions of polyamide-imides in a polar organic solvent such as one of those listed above. The solutions can be prepared by processes such as are described in French Pats. Nos. 1,386,617 and 1,473,600 and in Netherlands application No. 68/10,941. The solution first obtained can if desired afterwards be diluted or concentrated to give them a desired absolute viscosity, which will generally be between 500 and 2500 poises at 25° C. Amongst these solutions, those in which the polyamide-imide possesses an intrinsic viscosity between 0.8 and 1.8 dl./g. (measured in an 0.5% solution in N-methylpyrrolidone) are preferred. It is advantageous to prepare the polyamide-imide in the solvent which the film is to contain when it is stretched. A solid film of the required solvent content is conveniently obtained by spreading the solution of polyamide-imide as a thin layer on a support and then heating the whole, preferably with ventilation, generally at between 100° and 200° C., controlling the evaporation of the solvent so that the solid film obtained contains the proportion of solvent which is to be present during the stretching operation.

If the films are formed on a metallic support, it is advantageous to incorporate into the polyamide-imide solution at least 0.5% by weight of an aromatic di-, tri- or tetracarboxylic acid anhydride and at least 0.5% by weight of an aromatic diprimary diamine, both based on the weight of polyamide-imide in the solution. This makes it possible to obtain films which can be detached easily from the metallic support. The aromatic anhydrides used for this purpose can be monoanhydrides such as phthalic anhydride or the anhydrides of General Formula I, in particular trimellitic anhydride. They can also be dianhydrides such as pyromellitic anhydride or a dianhydride of general formula:

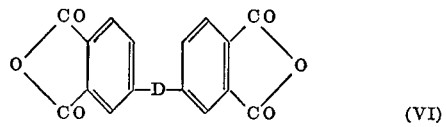

(VI)

in which D is a divalent radical such as:

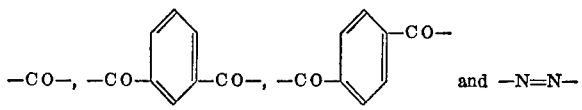

and —N=N—

Amongst these latter dianhydrides, there may more particularly be mentioned azophthalic anhydride and the dianhydride of benzophenone-3,3',4,4'-tetracarboxylic acid. As diamines which can be used with the anhydrides for the abovementioned purpose there may be mentioned the compounds of Formula V, especially 4,4'-diamino-diphenyl-ether and 4,4'-diaminodiphenylmethane. Preferred proportions of anhydride and of diamine are between 1% and 3% on the weight of polyamide-imide.

In one particularly advantageous embodiment of the invention, films of trimellamide-imides derived on the one hand from trimellitic anhydride and on the other from 4,4' - diisocyanato-diphenyl-ether or 4,4'-diisocyanato-diphenylmethane are treated.

The stretching to which the films are subjected can be monodirectional, but is preferably bidirectional, in which case it is preferred to stretch the film in the two directions successively. The stretching ratio in a given direction, defined by the ratio of the dimension of the film after stretching and the initial dimension in the direction in question, is preferably between 1.1 and 1.6. Whilst the speed of stretching has little effect on the elongation at break of the treated film, speeds between 10% and 300% per minute and preferably between 10% and 50% per minute are generally chosen, the percentage being based on the initial dimension of the film in the direction in question.

In one particular embodiment of the invention, when the solution of polyamide-imide has been formed into a thin layer on the support, a part of the solvent can be driven off by evaporation by heating the whole at between 100° and 150° C. until a solid film which can be detached from the support is obtained. Depending on the duration of heating, the film obtained after cooling generally contains from 20 to 30% by weight of solvent and can advantageously be stretched at a temperature between 150° and 200° C.

In another embodiment the film is heated to a temperature between 150° and 230° C. after having been separated from the support; its solvent content is then generally about 5% to 10%, and in this case the stretching is advantageously carried out at a temperature between 230° and 300° C.

In a third method of working a film which has first been stretched in accordance with the first particular embodiment described above is heated and again stretched in accordance with the second embodiment.

Regardless of the practical embodiment employed for the stretching, the film is thereafter subjected to a subsequent heat treatment to stabilize its mechanical properties. This heat treatment preferably consists in a gradual heating of the film, which can be continuous or take place in stages, to between 150° and 300° C., generally for one or two hours, naturally while it is held under tension to prevent shrinkage.

The films of the invention are particularly suitable for insulating flexible conductors by winding them with film in the form of a strip, and also for insulating armature slots of high power motors.

The examples which follow illustrate the invention:

EXAMPLE 1

A film of trimellamide-imide in the shape of a square of 18 cm. side length and 85μ thickness, obtained from trimellitic anhydride and 4,4' - diisocyanato-diphenyl-ether, and containing 25% by weight of N-methylpyrrolidone, is placed on a frame possessing two parallel movable jaws connected by means of a screw which allows their distance to be changed without changing the parallelism. Two opposite edges of the sample are each fixed in one of these jaws and the other two edges are held fixed by means of grippers integral with the two corresponding sides of the frame.

The frame and the film, assembled in this way, are placed in a ventilated chamber kept at 165° C. and the jaws are moved apart in the plane of the film for 40 seconds, the stretching ratio thus reaching 1.4.

The film is kept under tension and subjected to a supplementary heat treatment initially at 150° C. for 30 minutes, than at 230° for 30 minutes and finally at 300° C. for 15 minutes.

After cooling, the film has the following properties at 25° C.:

Thickness _____ mμ__ 45
Tensile strength _____ kg./mm.²__ 29
Elongation at break _____ percent__ 34

If a sample of the same film is subjected to this heat treatment but without prior stretching, the resulting film has an elongation at break of only 20%.

The trimellamide-imide film was prepared in the manner described below.

A solution of 249.6 g. of trimellitic anhydride and of 327.6 g. of 4,4'-diisocyanato-diphenyl-ether in 1347 g. of N-methylpyrrolidone is gradually heated to 190° C. and then diluted with 1200 g. of N-methylpyrrolidone. Thereafter the resulting solution is heated at 190° C. until it has an absolute viscosity of 1700 poises at 25° C. This solution contains 16.5% by weight of trimellamide-imide of intrinsic viscosity 1.53 dl./g. at 25° C. (measured in an 0.5% solution in N-methylpyrrolidone). A part of this solution is cast as a thin film on a 180 mm. wide glass plate. Thereafter the whole is heated for 50 minutes in a ventilated chamber kept at 100°–140° C. After being cooled, the film is detached from its support.

EXAMPLE 2

The experiment described in Example 1 is repeated, but with the modifications described below.

Before being stretched, the film is fixed on a rigid frame and subjected to a preliminary heat treatment for 30 minutes at 150° C. followed by 30 minutes at 230° C. After this treatment, its N-methylpyrrolidone content is 6% by weight. The film is then stretched at 260° C. for 20 seconds to a stretching ratio of 1.2.

At the end of the supplementary heat treatment, the film has the following properties at 25° C.:

Thickness _____ mµ __ 50
Tensile strength _____ kg./mm.² __ 23
Elongation at break _____ percent __ 36

EXAMPLE 3

The experiment described in Example 1 is repeated, but starting from a film containing 27% by weight of N-methylpyrrolidone, formed on a stainless steel support, stretching being carried out for 20 seconds up to a stretching ratio of 1.2.

A film which has the following properties at 25° is finally obtained:

Thickness _____ mµ __ 55
Tensile strength _____ kg./mm.² __ 22
Elongation at break _____ percent __ 40

A sample of the same film which had not been stretched had an elongation at break of only 27%.

The film used was obtained as follows.

A solution prepared by adding 1.45 g. of pyromellitic anhydride and 1.45 g. of 4,4'-diamino-diphenylether to 35 g. of N-methylpyrrolidone is gradually added, with stirring, to 1000 g. of a solution of trimellamide-imide obtained as in Example 1.

A part of the resulting solution is cast as a thin film on a 180 mm. wide stainless steel plate, after which the plate is heated at 100–140° C. for 35 minutes in a ventilated chamber; after cooling, the film is detached from the support.

EXAMPLE 4

A 100µ thick film of trimellamide-imide, containing 28% of N-methylpyrrolidone, formed continuously on a stainless steel belt, is longitudinally stretched to a ratio of 1.12 by passing it over rollers possessing different speeds of rotation while it is passing through a zone heated to 180° C.

The film is thereafter continuously fixed onto a stretching frame of which the grippers are carried by two endless belts. The frame passes, in 8 minutes, through an oven heated to 180° C., during which the film is stretched transversely to a ratio of 1.07.

Thereafter the film is subjected to a further longitudinal stretching (ratio 1.15) at 280° C., and is then again continuously fixed onto a stretching frame which passes, in 10 minutes, through a 3.3 m. long oven whose temperature rises from 250° C. at the inlet to 330° C. at the outlet. In the central part of the oven, the film is transversely stretched (ratio 1.15) over the course of 4 minutes.

At the end of this treatment, the film, has the following properties:

Thickness _____ mµ __ 50
Tensile strength (kg./mm.²):
    Longitudinal direction _____ 18.5
    Transverse direction _____ 18.5
Elongation at break (percent):
    Longitudinal direction _____ 37
    Transverse direction _____ 48

If a sample of the same film is subjected to an identical heat treatment but without stretching, the elongation at break is only 22%.

The film used initially was prepared from a solution of trimellamide-imide obtained as in Example 1, the amounts of products employed being multiplied by 25. Thereafter trimellitic anhydride and 4,4'-diamino-diphenyl-ether were added to the resulting solution in the proportions indicated in Example 3. The resulting solution was continuously cast as a thin film onto a 46 cm. wide stainless steel belt and the whole passed through a ventilated chamber heated to 125° C. over the course of 40 minutes, at a speed of 18 m./hour.

Films obtained in accordance with the examples show uniplanar axial structure.

We claim:

1. Film of polyamide-imide with a high elongation at break, in which the polyamide-imide consists essentially of a succession of structural units of formula:

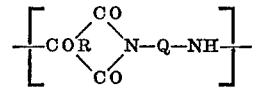

in which R is a trivalent organic radical selected from

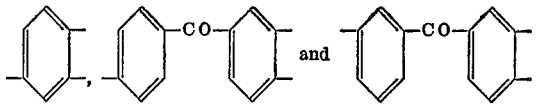

and Q is a divalent radical containing at least one benzene nucleus selected from m- and p-phenylene, p,p'-diphenylene,

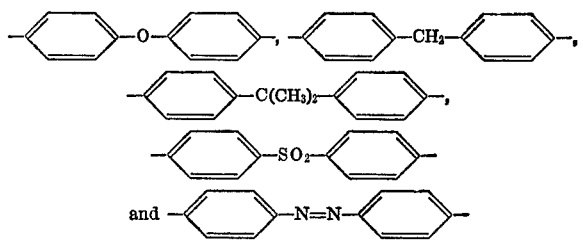

and which has a uni-planar axial structure.

2. Film acording to claim 1, in which the R is

and Q is

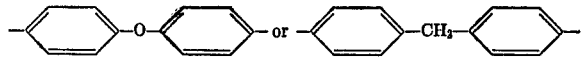

3. Film according to claim 2 having an elongation at break of from about 34% to about 48%.

References Cited

UNITED STATES PATENTS

| | | | |
|---|---|---|---|
| 3,260,691 | 7/1966 | Lavin et al. | 260—30.2 |
| 3,314,923 | 4/1967 | Muller et al. | 260—78 |
| 3,347,828 | 10/1967 | Stephens et al. | 260—47 |
| 3,541,038 | 11/1970 | Nakand et al. | 260—30.6 |
| 3,619,461 | 11/1971 | Gay | 264—288 |

OTHER REFERENCES

Miller, The Structure of Polymers, Polymer Science and Engineering Series, p. 560 (1968).

LESTER L. LEE, Primary Examiner

U.S. Cl. X.R.

260—65, 78 TF, 264—288